July 17, 1923.

E. A. BEYL

BACKSTOP FOR ELEVATORS AND THE LIKE

Filed Feb. 27, 1922    2 Sheets-Sheet 1

1,462,318

Inventor
Emil A. Beyl
By his Attorneys
Merchant and Kilgore

July 17, 1923.
E. A. BEYL
1,462,318
BACKSTOP FOR ELEVATORS AND THE LIKE
Filed Feb. 27, 1922  2 Sheets-Sheet 2
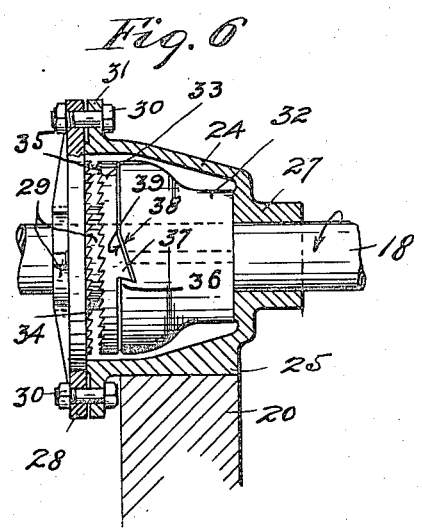
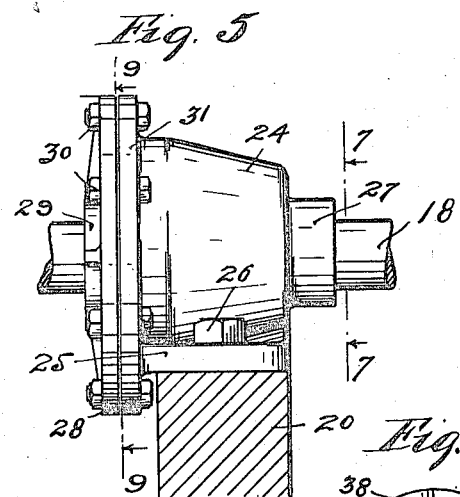
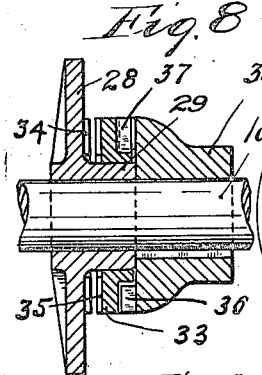
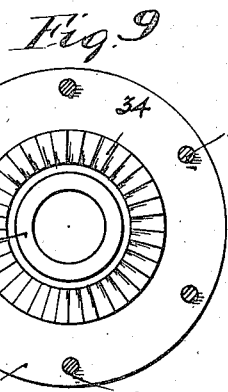
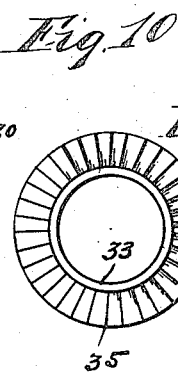
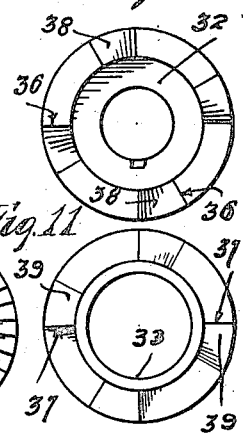
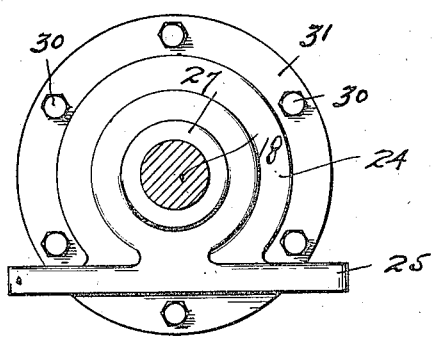
Inventor
Emil A. Beyl
By his Attorneys
Merchant and Kilgore Patented July 17, 1923.

1,462,318

UNITED STATES PATENT OFFICE.

EMIL A. BEYL, OF MINNEAPOLIS, MINNESOTA.

BACKSTOP FOR ELEVATORS AND THE LIKE.

Application filed February 27, 1922. Serial No. 539,796.

*To all whom it may concern:*

Be it known that I, EMIL A. BEYL, a citizen of the United States, residing at Minneapolis, in the county of Hennepin and State of Minnesota, have invented certain new and useful Improvements in Backstops for Elevators and the like; and I do hereby declare the following to be a full, clear, and exact description of the invention, such as will enable others skilled in the art to which it appertains to make and use the same.

My present invention relates broadly to power transmission mechanism and especially to such mechanism for elevators, hoists, conveyors and the like, of the endless travelling type, which carry a load in one direction only and return empty and are thus overbalanced on the loaded side and have a tendency to overcome the power transmission mechanism therefor and travel backwards.

The object of my invention is to provide an automatic backstop to prevent such backward travel in case the power transmission mechanism should be accidentally rendered inoperative due to slippage, breakage or any other defect.

For the purpose of illustrating the invention applied in working position, there is illustrated in the drawings a grain elevator of the cup-equipped belt type. In case the power transmission mechanism for the cup-equipped belt of this elevator should by accident be released therefrom, the weight of the grain in the cups on the upwardly moving section of said belt will cause the cup-equipped belt to travel backwards, thereby causing the cups and the grain in the cups to clog or pile up in the pit at the bottom of the elevator. Before the elevator can again be started, after the necessary repairs have been made, this piled-up grain must be removed, thus causing considerable delay and extra work.

By the application of my improved backstop to the driving shaft of this type of elevator, the instant that the power transmission mechanism is released therefrom, and said shaft starts to rotate backwards, due to the pull thereon by the section of the belt having the loaded cups, the backstop will automatically operate to hold the driving shaft, and as soon as the power is again applied to said shaft, the backstop will be automatically released, by the forward rotation of the driving shaft, and will remain inactive, but set to automatically hold the driving shaft in case the same again starts to rotate backwards.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 5 is a side elevation of the improved backstop, as applied in Fig. 1;

Fig. 6 is a view corresponding to Fig. 5 with the exception that the housing and a portion of its head are shown partly in section;

Fig. 7 is a view principally in end elevation with the driving shaft sectioned on the line 7—7 of Fig. 5;

Fig. 8 is a view principally in vertical section with the front section of the housing removed;

Fig. 9 is a view partly in elevation and partly in section taken on the line 9—9 of Fig. 5;

Figs. 10 and 11 are views of the laterally movable clutch member showing the ratchet tooth-equipped faces thereof; and Fig. 12 is an elevation of the driving head showing the ratchet tooth-equipped face thereof.

Figure 1:
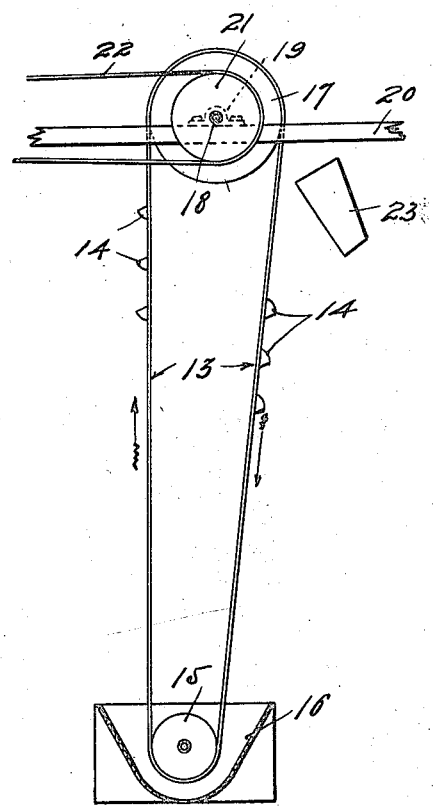
Fig. 1 is a view partly in side elevation and partly in section illustrating, in diagram, an elevator of the cup-equipped belt type to which my invention is applied.
Figure 2:
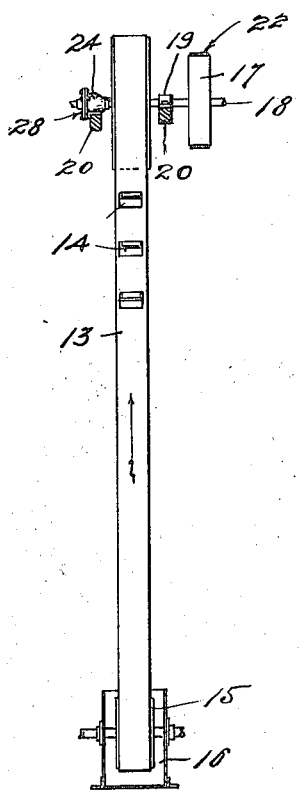
Fig. 2 is a view principally in front elevation of the parts shown in Fig. 1 and also showing the improved backstop applied to the driving shaft and serving as one of the bearings therefor.

Of the parts of the grain elevator illustrated, the numeral 13 indicates an endless belt, equipped with longitudinally spaced cups 14 and arranged to run over a relatively small idle pulley 15 journaled in a pit 16 and over a relatively large over-head pulley 17, keyed to a driving shaft 18. This driving shaft 18, as shown in Figs. 1 and 2, is journaled in a bearing 19 and the improved backstop, which serves as a second bearing for the driving shaft 18, and which bearing and backstop are secured to bridge trees 20. Keyed to the right-hand end of the driving shaft 18 is a pulley 21 over which runs a driving belt 22. Obviously, the cups 14 are filled in the pit 16 and discharge their contents into a spout 23 after having passed over the pulley 17.

Figure 3:
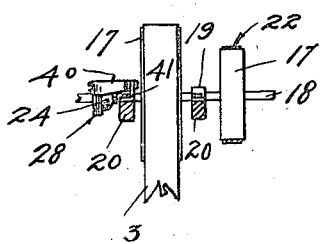
Fig. 3 is a fragmentary view of the upper portion of the elevator in which the improved backstop is applied to the driving shaft outward of the adjacent bearing and is anchored to one of the bridge trees.
Figure 4:
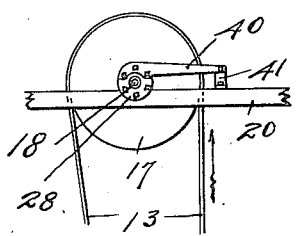
Fig. 4 is a left side elevation of the part shown in Fig. 3.

In Figs. 3 and 4, the driving shaft 18 is journaled in two bearings 19 and the improved backstop is located outward thereof. The parts thus far described are of standard and well known construction, and have been illustrated simply for the purpose of showing the invention applied in working position.

Referring now in detail to the improved backstop, as illustrated in Figs. 5 to 12, inclusive, the numeral 24 indicates a housing having an integrally formed base 25 which extends on opposite sides thereof, rests on the respective bridge trees 20 and is secured thereto by bolts 26. The right-hand end of the housing 24 is closed except for a bearing hub 27 in which the driving shaft 18 is journaled. The other or left-hand end of the housing 24 is open and normally closed by a displaceable head 28 having a bearing hub 29 in which the driving shaft 18 is also journaled. For a purpose that will presently appear, the bearing hub 29 is extended into the housing 24 for a considerable distance.

The displaceable head 28, which serves as a fixed member, is rigidly but detachably secured to the housing 24 by a plurality of nut-equipped bolts 30 which extend through bores therein and through aligned bores in an external flange 31 integral with the housing 24. Keyed to the driving shaft 18 within the housing 24 is a driving head 32, the right-hand end of which engages the bearing hub 27 as a base of resistance against axial movement. Interposed between the displaceable head 28 and driving head 32 is a clutch member 33 in the form of a floating ring rotatable on the hub 29 with freedom for lateral movement. On the opposing faces of the displaceable head 28 and clutch member 33 are co-operating ratchet teeth 34 and 35, respectively. These ratchet teeth 34 and 35 are normally separated, as best shown in Fig. 6, to permit free rotation of the clutch member 33.

On the opposing faces of the driving head 32 and clutch member 33 are co-operating ratchet teeth 36 and 37, respectively. These ratchet teeth 36 and 37 have a much greater transverse width than the ratchet teeth 34 and 35 and are reversely formed in respect thereto, and are always in engagement, the one with the other. The ratchet teeth 36 and 37 are arranged to cause the clutch member 33 to rotate with the driving head 32 when the driving shaft 18 is rotating forward in a direction opposite to the direction of the arrow on the driving shaft 18 in Fig. 6. Co-operating cam surfaces 38 and 39 are formed, respectively, with the driving head 32 and clutch member 33 to move said clutch member laterally, by a slight backward rotation in the direction of the arrow on the shaft in Fig. 6 of the driving head 32, and thereby cause the ratchet teeth 35 to engage the ratchet teeth 34 and stop said backward rotation.

From the above description, it is evident that during the forward rotation of the driving shaft 18, the clutch member 33 by the engagement of its ratchet teeth 37 with the ratchet teeth 36 is caused to rotate with the driving head 32, and at which time the ratchet teeth 34 and 35 are separated so that they do not touch. In case the power transmission mechanism for the driving shaft 18 is released therefrom, backward rotation will be imparted to said driving shaft by the weight of the filled cups 14 on the upwardly moving section of the belt 13. This backward rotation of the driving shaft 18 will cause the cam surfaces 38 to ride upon the cam surfaces 39 and thereby move the clutch member 33 laterally and cause its ratchet teeth 35 to engage the ratchet teeth 34 and prevent further backward rotation of the driving shaft 18.

When the driving shaft 18 is again rotated forward by its power transmission mechanism, the ratchet teeth 36 will engage the ratchet teeth 37 and thereby cause the clutch member 33 to again rotate with the driving head 32. The initial forward rotation of the clutch member 33 will cause the ratchet teeth 34 to cam the ratchet teeth 35 out of engagement therewith and move the clutch member 33 laterally toward the driving head 32. To further assist in causing the clutch member 33 to move laterally toward the driving head 32, and thereby keep the ratchet teeth 34 and 35 separated during the forward rotation of the driving shaft 18, the ratchet teeth 36 and 37 are undercut as shown in Fig. 6.

The frictional engagement of the clutch member 33 with the bearing hub 29 will tend to retard the rotation of said clutch member, at the time the driving head 32 starts to rotate backwards, and thereby prevents said clutch member from rotating with the driving head 32, which would prevent the cam surfaces 38 from acting on the cam surfaces 39 to move the clutch member 33 laterally.

The above described invention, while extremely simple and of comparatively small cost to manufacture, has in actual usage proven highly efficient for the purpose had in view. It is evident that the improved backstop may be very easily applied to power transmission mechanism already installed without changing the same in any manner whatsoever.

Referring again to the improved backstop, as shown in Figs. 3 and 4, the same is applied to the driving shaft independently of the bearings therefor. When the backstop is thus applied, the housing 24 and the head 28 are held against rotation on the driving shaft 18 by an arm 40. This arm 40 is secured to the head 28 by certain of the nut-equipped bolts 30 and is anchored at 41 to the adjacent bridge tree 20. It will be noted that the arm 40 is arranged to bear downward on the respective bridge tree 20 under the action of backward rotation of the driving shaft 18.

What I claim is:

1. The combination with a fixed member and a rotary driving member, of an interposed clutch member, said driving member and clutch member having reversely acting ratchet surfaces that are always in engagement and said fixed member and clutch member having ratchet acting surfaces that are disengageable and engageable, respectively, by forward and rearward movements of said driving member.

2. The structure defined in claim 1 in which the ratchet surfaces of the driving member and clutch member have a greater transverse width than the ratchet surfaces of the fixed member and clutch member.

3. The combination with a fixed member and a rotary driving member, of an interposed clutch member, said fixed member and clutch member having reversely acting ratchet teeth, normally disengaged, said clutch member being connected to the driving member for forward rotation therewith, said driving member and clutch member having co-operating cam surfaces arranged to move the clutch member laterally to engage its ratchet teeth with the ratchet teeth of the fixed member, by a backward movement of the driving member.

4. The combination with a fixed member and a rotary driving member, of an interposed clutch member, said fixed member and clutch member having reversely acting ratchet teeth, normally disengaged, said driving member and clutch member having reversely acting ratchet teeth, always in engagement to rotate the clutch member forward with the driving head and arranged to cam the clutch member laterally, by a backward movement of the driving member, to connect the normally disengaged ratchet teeth of the clutch member and the fixed member to stop the backward rotation of the driving member.

5. The structure defined in claim 3 in which the interposed clutch member has slight frictional engagement with the fixed member.

6. The combination with a fixed member having a hub and a rotary driving member, of an interposed clutch member rotatable on the hub of the fixed member with freedom for lateral movement, said fixed member and clutch member having reversely acting ratchet teeth, normally disengaged, said clutch member being connected to the driving member for forward rotation therewith, said driving member and clutch member having co-operating cam surfaces arranged to move the clutch member laterally to engage its ratchet teeth with the ratchet teeth of the fixed member by a backward movement of the driving member.

7. The structure defined in claim 3 in which the co-operating ratchet teeth of the driving member and clutch member have undercut engagement to draw the clutch member laterally toward the driving member during the forward rotation thereof.

8. The combination with a driving shaft having a fixed driving head, of a housing mounted on said shaft for the driving head and having a fixed member, an interposed clutch member, said fixed member and clutch member having reversely acting ratchet teeth, normally disengaged, said clutch member being connected to the driving head for forward rotation therewith, said driving head and clutch member having co-operating cam surfaces arranged to move the clutch member laterally to engage its ratchet teeth with the ratchet teeth of the fixed member of the housing by a backward movement of the driving head.

9. The combination with a driving shaft having a fixed driving head, of a housing mounted on said shaft for the driving head and having a head attached thereto in which said shaft is rotatably mounted, means for holding the housing and its head against rotation on the shaft, an interposed clutch member, said housing and clutch member having reversely acting ratchet teeth, normally disengaged, said clutch member being connected to the driving head for forward rotation therewith, said driving head and clutch member having co-operating cam surfaces arranged to move the clutch member laterally to engage its ratchet teeth with the ratchet teeth of the housing head by a backward movement of the driving head.

10. The combination with a bearing having a fixed member, a driving shaft journaled in the bearing and having a driving head, an interposed clutch member, said fixed member and clutch member having reversely acting ratchet teeth, normally disengaged, said clutch teeth being connected to the driving head for forward rotation therewith, said driving head and clutch member having co-operating cam surfaces arranged to move the clutch member laterally to engage its ratchet teeth with the ratchet teeth of the fixed member by a backward movement of the driving head.

11. The combination with a bearing having a housing provided with a displaceable head, of a driving shaft journaled in said bearing and displaceable head, said driving shaft having a fixed driving head in the housing, an interposed clutch member, said displaceable head and clutch member having reversely acting ratchet teeth normally disengaged, said clutch member being connected to the driving head for forward rotation therewith, said driving head and clutch member also having co-operating surfaces arranged to move the clutch member laterally to engage its ratchet teeth with the ratchet teeth of the displaceable head by a backward movement of the driving head.

In testimony whereof I affix my signature.

EMIL A. BEYL.